United States Patent [19]

Chiodini et al.

[11] Patent Number: 5,399,633
[45] Date of Patent: Mar. 21, 1995

[54] ADDITIVES FOR THE CURE WITH PEROXIDES OF FLUOROELASTOMERS CONTAINING BROMINE OR IDODINE TO REDUCE ALKYLHALO EMISSIONS

[75] Inventors: Graziella Chiodini, Varese; Anna Minutillo, Milan, both of Italy

[73] Assignee: Ausimont S.r.l., Milan, Italy

[21] Appl. No.: 296,939

[22] Filed: Aug. 29, 1994

Related U.S. Application Data

[63] Continuation of Ser. No. 26,165, Mar. 1, 1993, abandoned, which is a continuation of Ser. No. 798,176, Nov. 26, 1991, abandoned, which is a continuation of Ser. No. 450,466, Dec. 14, 1989, abandoned.

[30] Foreign Application Priority Data

Dec. 16, 1988 [IT] Italy .................................. 22995/88

[51] Int. Cl.$^6$ ............................ C08F 8/34; C08F 8/00
[52] U.S. Cl. ................................. 525/349; 525/326.3; 525/352; 525/364; 525/370; 525/374; 525/375; 525/386
[58] Field of Search ............... 525/349, 370, 374, 375, 525/352, 364, 386

[56] References Cited

U.S. PATENT DOCUMENTS

| | | |
|---|---|---|
| 2,955,104 | 10/1960 | Smith et al. . |
| 3,344,126 | 9/1967 | Witman . |
| 4,529,759 | 7/1985 | Ojakaar .............................. 525/326.3 |
| 4,831,085 | 5/1989 | Okabe ................................. 525/387 |

FOREIGN PATENT DOCUMENTS

| | | |
|---|---|---|
| 101930 | 7/1984 | European Pat. Off. . |
| 4024343 | 2/1991 | Germany . |

OTHER PUBLICATIONS

Encyclopedia of Chemical Technology (1982) 3rd Ed. vol. 20, pp. 390–396.
Encyclopedia of Chemical Technology (1979) 3rd Ed. vol. 8, p. 506
Encyclopedia of Chemical Technology (1980) 3rd Ed. vol. 11, p. 58.

*Primary Examiner*—Christopher Henderson
*Attorney, Agent, or Firm*—Stevens, Davis, Miller & Mosher

[57] ABSTRACT

The emission of the highly toxic volatile products, such as methyl bromides or iodides, or ethyl bromides or iodides, during the cure with peroxides of fluoroelastomers containing bromine or iodine atoms is substantially reduced by adding to the cure mix small amounts of substances capable of combining with the radicals which give rise to the aforesaid toxic products, thereby preventing them from forming. This procedure does not sensibly affect the cure trend and results.

5 Claims, No Drawings

ADDITIVES FOR THE CURE WITH PEROXIDES OF FLUOROELASTOMERS CONTAINING BROMINE OR IDODINE TO REDUCE ALKYLHALO EMISSIONS

CROSS REFERENCE TO RELATED APPLICATION

This application is a Continuation of application Ser. No. 08/026,165, filed Mar. 1, 1993, now abandoned, which in turn is a Continuation of application Ser. No. 07/798,176, filed Nov. 26, 1991, now abandoned, which in turn is a Rule 60 Continuation of application Ser. No. 07/450,466, filed Dec. 14, 1989, now abandoned.

SUMMARY OF THE INVENTION

1. Background of the Invention

The present invention is directed to reduction in the emission of highly toxic volatile products, such as methyl bromides or iodides or ethylbromoides or iodides during the cure of fluoroelastomers with peroxides.

2. Description of the Related Art

Thus, it is an object of the present invention to obviate the above-mentioned serious drawback by adding to the cure mix a substance capable of substantially reducing the emission of methyl or ethyl bromides or iodides during the cure.

In fact, it has surprisingly been found that certain substance types introduced into the mix in a moderate amount, generally ranging from 0.1 to 3 parts by weight for 100 parts by weight of fluoroelastomer, are capable of substantially reducing the emission of said toxic products without sensibly altering the cure trend or the characteristics of the resulting vulcanizate. The action mechanism of the additives according to the present invention is probably based on the fact that they are capable of combining with the methyl or ethyl radicals deriving from the organic peroxide, thereby forming new radicals capable of continuing the cross-linking reaction, so preventing any formation of methyl or ethyl bromides or iodides. However, on the basis of such assumption it is not possible to foresee which substances are actually suited as additives according to the invention: in fact, many substances which are surely capable of blocking the methyl and ethyl radicals and which drastically reduce the emission of the abovesaid bromides and iodides, negatively interfere with the cure process, causing it to become extremely slow and inefficacious and giving rise to vulcanizates of very bad quality.

DESCRIPTION OF THE PREFERRED EMBODIMENTS

The products suited as additives according to the present invention are the ones belonging to the following classes:

a) Benzothiazole and derivatives thereof of general formula:

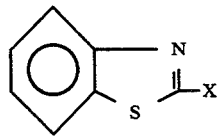

wherein:
X represents H, —SH,

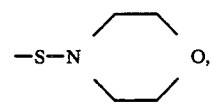

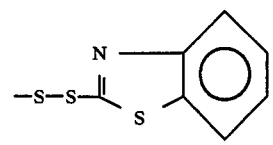

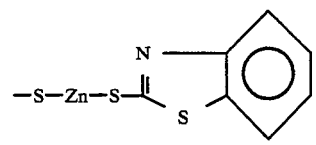

in particular benzothiazole, 2-mercaptobenzothiazole, benzothiazole disulphide, morpholin-2-benzothiazole sulphenamide, zincmercapto-benzothiazole.

b) Maleamide derivatives of general formula:

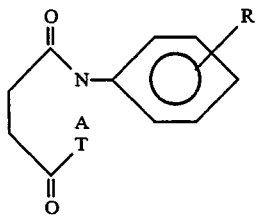

wherein A=H, T represents —OH,

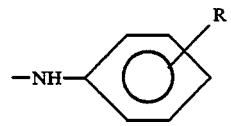

R represents H, alkyl with 1 to 6C, halogen, —NO$_2$

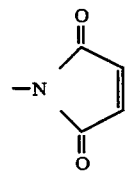

c) Thiurams derivatives of general formula:

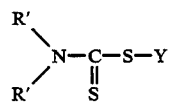

wherein Y represents

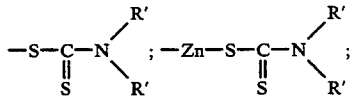

R' represents alkyl with 1 to 4C, in particular tetraalkyl-thiuram disulphide, zincdiethyldithiocarbamate.

d) Diphenylguanidine derivatives of general formula:

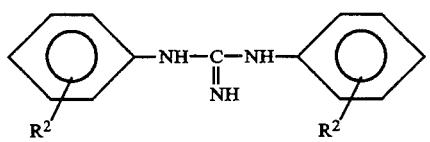

wherein $R^2$ represents H, alkyl with 1 to 6C, in particular the compounds wherein $R^2$ represents H or $CH_3$. Moreover other compounds such as maleic anhydride, diaryl-formamidines and the derivatives of diazo- and triazo-dicyclodecenes are resulted to be suited as additives.

The additives according to the present invention, when used in amounts generally ranging from 0.1 to 3 parts by weight for 100 parts by weight of elastomer (p.h.r.) and in particular from 0.2 to 2 p.h.r., beside sensibly reducing the emission of the toxic products methyl or ethyl bromide or iodide, in some cases also by 90%, impart to the curable composition the following characteristics:

increase of the time which is necessary for the scorching to occur (scorching time) and, by consequence, a higher processing safety;

decrease of the Mooney viscosity of the mix and therefore an improved processability;

moderate influence on the cross-linking rate and yield at 180° C.

All the additives indicated hereinbefore can be prepared according to known methods described in the technical literature.

The fluoroelastomers, to which the present invention is applicable, are all those which contain bromine or iodine atoms ascure sites.

Among the most known, the following are to be cited: copolymers of $CH_2=CF_2$ with $CF_3—CF=CF_2$ and optionally also with $C_2F_4$ with perfluorovinylethers, containing little amounts of bromine or iodine which are introduced by copolymerizing a little amount of brominated or iodidated monomer such as brominated olefins, perfluorobromoalkylperfluorovinylethers, or also by using chain transferors consisting of bromo- or iodo-alkyl compounds.

The mixes based on fluoroelastomers curable with peroxides, which can be additioned according to the present invention comprise, beside the organic peroxide, conventional ingredients such as carbon black and other reinforcing fillers, peroxide curing co-agents (for example triallyl isocyanurate), metal oxides or hydroxides (for example PbO, ZnO), and processing aids.

The following examples are given merely to illustrate but not to limit the present invention.

The evaluation of the $CH_3Br$ emission under curing conditions was generally carried out according to the following method:

Modalities for Dosing the $CH_3Br$ Emission 20 g of a finely particled mix (polymer+fillers) are treated at 180° C. in a closed reactor, for 30 minutes at a pressure of 0.5 kg/cm$^2$ abs. in a nitrogen atmosphere.

Then the mix is cooled to 40°–50° C. and, as an interior standard, 1 cc of A114 ($C_2Cl_2F_4$, b.p.=4° C.) is added.

The gas phase is mixed and subjected to gas-chromatographic analysis.

Column: POROPAK Q

T=100° C.

In example 2, conversely, the actual emission occurring under practical curing conditions at 170° C. is determined by determining the $CH_3Br$ in air samples withdrawn above the mold.

Utilized elastomer:

P.1 terpolymer of $CH_2=CF_2$ 66.2% by moles, $C_3F_6$ 18.2%, $C_2F_4$ 15.2%, containing bromoperfluoroethylvinylether in an amount equal to 0.65% by weight of bromine.

P.2 terpolymer of $CH_2=CF_2$ 54.1% by moles, $C_3F_6$ 22.2%, $C_2F_4$ 22.9%, containing bromoperfluoroethylvinylether in an amount equal to 0.54% by weight of bromine.

The ingredients of the mixes, besides the additive according to the invention, are, in parts by weight for 100 parts by weight of terpolymer, the following:

2,5-dimethyl-2,5-di-ter.butyl-peroxy-hexane at 45% on inert filler (Luperco 101XL), 3 parts;

triallyl isocyanurate (TAIC) at 75% on inert filler, 4 parts;

PbO, 3 parts;

carbon black MT, 30 parts.

The evaluation of the cure trend is carried out by determining the Δ torque (MH-ML) by means of an ODR oscillating disc rheometer (Monsanto type) according to standard ASTM D 2084/81.

Measuring is effected at 180° C., the maximum torque MH is determined after 12 minutes, by "arc 3".

EXAMPLE 1

The tests were carried out using terpolymer P.1.

The elastomer without the additive of the invention provided during curing a Δ torque equal to 71.

In some tests, the low reduction of the $CH_3Br$ emission was due to the insufficient amount of additive: by increasing said amount within the above-cited range, it is possible to improve the effect (see for example tests 7 and 8).

Test 21 is a comparison test and represents the case of products which drastically reduce the $CH_3Br$ emission, but at the same time they prevent or strongly reduce the cure.

TABLE 1

| TEST No. | ADDITIVE | PHR ADDITIVE | Δ TORQUE MH-ML (STANDARD = 71) | % REDUCTION OF CH$_3$Br EMISSION |
|---|---|---|---|---|
| 1 | (structure) | 1.65 | 60 | 72% |

TABLE 1-continued
| TEST No. | ADDITIVE | PHR ADDITIVE | Δ TORQUE MH-ML (STANDARD = 71) | % REDUCTION OF CH₃Br EMISSION |
|---|---|---|---|---|
| 2 | 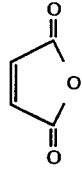 | 0.5 | 65 | 26% |
| 3 | 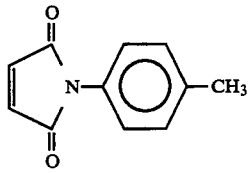 | 1.60 | 70 | 17% |
| 4 | 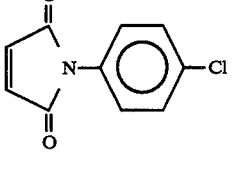 | 1.80 | 68 | 34% |
| 5 | 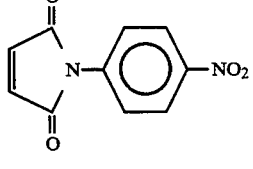 | 0.5 | 71 | 31% |
| 6 | 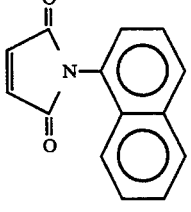 | 1.92 | 72 | 31% |
| 7 | 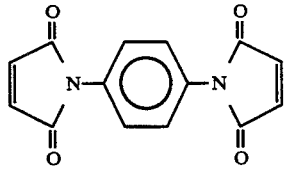 | 1.15 | 64 | 35% |
| 8 | 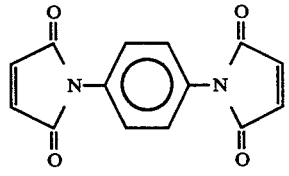 | 0.77 | 66 | 17% |
| 9 | 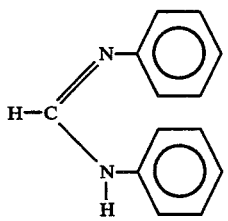 | 1.68 | 51 | 77% |

TABLE 1-continued

| TEST No. | ADDITIVE | PHR ADDITIVE | Δ TORQUE MH-ML (STANDARD = 71) | % REDUCTION OF CH$_3$Br EMISSION |
|---|---|---|---|---|
| 10 | diphenylguanidine (PhNH-C(=NH)-NHPh) | 0.9 | 59 | 57% |
| 11 | di(o-tolyl)guanidine | 1.0 | 60 | 51% |
| 12 | (bicyclic amidine structure) | 1.8 | 52 | 84% |
| 13 | (bicyclic guanidine structure) | 1.2 | 51 | 86% |
| 14 | benzothiazole | 0.5 | 65 | 28% |
| 15 | MBT (mercaptobenzothiazole) | 0.5 | 70 | 70–80% |
| 16 | MBTS (dibenzothiazyl disulfide) | 0.5 | 71 | 70–90% |
| 17 | tetraetilthiuramdisulphide | 0.5 | 68 | 90% |
| 18 | zincodiethyldithiocarbamate | 0.5 | 67 | 87% |
| 19 | (ZMBT) Zn mercaptobenzothiazole | 0.5 | 72 | 61% |

TABLE 1-continued

| TEST No. | ADDITIVE | PHR ADDITIVE | Δ TORQUE MH-ML (STANDARD = 71) | % REDUCTION OF CH₃Br EMISSION |
|---|---|---|---|---|
| 20 | 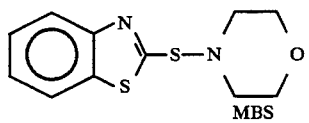 MBS Morpholine 2-benzothiazole sulphenamide | 0.5 | 80 | 79% |
| 21 | FOR COMPARISON 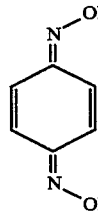 Benzoquinone dioxime | 0.6 | 8 | 90% |

EXAMPLE 2

Test were carried out in order to check the correspondence between the $CH_3Br$ reduction determined by means of the laboratory test described for example 1 and the actual reduction achieved in the curing process in mold at 170° C. under actual conditions, determined by analysis of an air sample withdrawn above the molded article immediately after having drawn the vulcanizate from the mold. The additive utilized was mercaptobenzothiazole disulphide (MBTS); a test was carried out without the additive in order to have a comparison of the values of the Δ torque and of the $CH_3Br$ emission.

The elastomer utilized was of the type P.2 described hereinbefore.

The results are the average of analytical determinations on 5 air drawings.

EXAMPLE 3

Characterization of the curable mixes and of the vulcanized product.

The characteristics compared with those of the non-additivated products are reported in the following tables.

In particular, from table 3 it is apparent that the mixes containing the additive according to the invention exhibit a remarkably higher scorching timen, a decrease of the Mooney scorch viscosity (at 135° C.) and a decrease of the Mooney viscosity at 121° C.; these characteristics are indicative of a better processability of the mix.

Table 4 contains some characteristic values which provide idications about the cure trend.

The characteristics of the cured material are reported in Table 5.

TABLE 2

| ADDITIVE | PHR | Δ MH—ML | PERCENT REDUCTION OF CH₃Br EMISSION LABORATORY TESTS | PERCENT REDUCTION OF CH₃Br EMISSION MOLDING TESTS |
|---|---|---|---|---|
| — | — | 62 | — | — |
| MBTS | 0.25 | 64 | 79% | 62% |
| MBTS | 0.5 | 66 | 85% | 98% |

TABLE 3

| | COMPOSITION OF THE MIX (ASTM D. 3182-82) PARTS BY WEIGHT FOR 100 PARTS BY WEIGHT OF POLYMER | | | | | | ASTM D. 1646-82 | | |
|---|---|---|---|---|---|---|---|---|---|
| | | additive | | | | carbon | 121° C. MOONEY | 135° C. MOONEY SCORCH | |
| Mix No. | polymer | (p. by wg.) | luperco | TAIC | PbO | blackMT | ML (1' + 10') | MV | t 15 |
| 1 | P. 1 | — | 3 | 4 | 3 | 30 | 86 | 42 | 11' 42" |
| 2 | P. 1 | NPM (1,5) | 3 | 4 | 3 | 30 | 84 | 40 | 24' 18" |
| 3 | P. 1 | MBT (0,5) | 3 | 4 | 3 | 30 | 74 | 35 | 61' 00" |
| 4 | P. 1 | MBTS (0,5) | 3 | 4 | 3 | 30 | 79 | 35 | 60' |
| 5 | P. 2 | — | 3 | 4 | 3 | 30 | 110 | 49 | 13' 18" |
| 6 | P. 2 | MBTS (0,25) | 3 | 4 | 3 | 30 | 102 | 45 | 26' 24" |

TABLE 3-continued

| | COMPOSITION OF THE MIX (ASTM D. 3182-82) PARTS BY WEIGHT FOR 100 PARTS BY WEIGHT OF POLYMER | | | | | | ASTM D. 1646-82 | | |
|---|---|---|---|---|---|---|---|---|---|
| | | additive | | | | carbon | 121° C. MOONEY | 135° C. MOONEY SCORCH | |
| Mix No. | polymer | (p. by wg.) | luperco | TAIC | PbO | blackMT | ML (1' + 10') | MV | t 15 |
| 7 | P. 2 | MBTS (0,5) | 3 | 4 | 3 | 30 | 101 | 43 | 33' 42" |

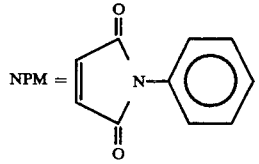

NPM =

MBT =

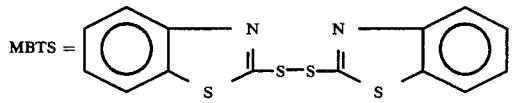

MBTS =

TABLE 4

| | Mix No. | CURING CHARACTERISTICS ASTM 02084-81 - ODR, 180° C.; arc +/−3 | | | | | | |
|---|---|---|---|---|---|---|---|---|
| POLYMER | (from tab. 3) | ML (lbf · in) | MH (lbf · in) | ts 2 (s) | t'50 (s) | t'90 (s) | V max (lbf · in/s) | MH—ML |
| P.1 | 1 | 23 | 82 | 69 | 117 | 243 | 0.75 | 59 |
| P.1 | 2 | 20 | 95 | 75 | 129 | 312 | 1.01 | 75 |
| P.1 | 3 | 16 | 77 | 129 | 219 | 348 | 0.41 | 61 |
| P.1 | 4 | 16 | 81 | 135 | 195 | 303 | 0.7 | 65 |
| P.2 | 5 | 24 | 86 | 69 | 126 | 360 | 0.63 | 62 |
| P.2 | 6 | 19 | 83 | 90 | 144 | 324 | 0.73 | 64 |
| P.2 | 7 | 17 | 83 | 99 | 153 | 330 | 0.80 | 66 |

TABLE 5

| | | MECHANICAL PROPERTIES | | | | | | | | | | | | |
|---|---|---|---|---|---|---|---|---|---|---|---|---|---|---|
| | | after press-cure (170° C. + 10') | | | | | | after post-cure (250° C. + 24 h) | | | | | | ASTM D1414 -78 (*) C.S. (%) |
| | | ASTM D.412-83 Tensile propert. | | | ASTM D.2240-8 Hardness (points) | ASTM D.624-81 Tear-Strength 170° C. | | ASTM D.412-83 Tensile properties | | | | ASTM D2240 -81 Hardness (points) | |
| POLYMER | Mix No. (from tab. 3) | (MPa) M100 | (MPa) M200 | (MPa) T.S. | (%) E.B. | H-shore A | (N/ /mm) F/s | (J/ /m) E/s | (MPa) M100 | (MPa) M200 | (MPa) T.S. | (%) E.B. | H-shore A | O-R 214 |
| P.1 | 1 | 4.3 | 9.9 | 10.8 | 234 | 70 | 3.3 | 11.5 | 5.9 | 14.7 | 15.2 | 189 | 73 | 30 |
| P.1 | 2 | 3.5 | 10.1 | 12.6 | 240 | 70 | 3.6 | 12.4 | 5.4 | 16.8 | 18.4 | 214 | 73 | 33 |
| P.1 | 3 | 2 | 5 | 8 | 349 | 67 | 3.4 | 14.2 | 4.6 | 13.2 | 14.9 | 219 | 74 | 44 |
| P.1 | 4 | 2.9 | 8.7 | 10.8 | 268 | 68 | 3.6 | 13.2 | 5.0 | 14.5 | 16.1 | 216 | 74 | 42 |
| P.2 | 5 | 3.7 | 8.3 | 11 | 306 | 73 | 4.9 | 28.1 | 5.5 | 15.8 | 18.5 | 227 | 74 | 33 |
| P.2 | 6 | 3.6 | 7.9 | 10.6 | 338 | 72 | 4.6 | 24 | 5.9 | 16.1 | 19.5 | 234 | 76 | 35 |
| P.2 | 7 | 3.7 | 8.1 | 10.9 | 319 | 72 | 4.3 | 22.2 | 5.9 | 16 | 19 | 230 | 76 | 34 |

(*) C.S. = compression set at 200° C. for 70 h.

EXAMPLE 4

The tests reported in Table 6 show that the reduction of the $CH_3Br$ emission and the cure trend vary on variation of the utilized polymer type and of the bromine content.

In all the tests reported in Table 6 the utilized additive was phenylmaleinimide:

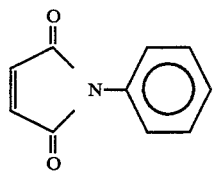

Other components of the mix were:

| Luperco | 3 p.h.r. |
|---|---|
| TAIC | 4 p.h.r. |
| PbO | 3 p.h.r. |

-continued

| carbon black | 30 p.h.r. |
|---|---|

TABLE 6

| POLYMER | ADDITIVE P.H.R. | Δ TORQUE MH—ML | % REDUCTION OF CH₃Br EMITTED |
|---|---|---|---|
| P.1 | — | 71 | — |
| P.1 | 1,5 | 76 | 15% |
| P.41 | — | 62 | — |
| P.41 | 1,5 | 55 | 29% |
| P.2 + P.41(+) mix | — | 65 | — |
| P.2 + P.41(+) mix | 1,5 | 64 | 37% |

Polymer P.41 contains:
$CH_2=CF_2$ 53,4%; $C_2F_4$ 23,9%; $C_3F_6$ 22,7%, and bromovinylether in an amount equal to 0.93% of Br.
(+) Bromine content of the polymeric mix: Br=0.72%.

We claim:
1. A method of reducing toxic emissions of alkylhalo compounds during curing of fluoroelastomers containing bromine and/or iodine cure sites, which comprises;
  i) preparing a curable fluoroelastomer mixture containing at least one fluoroelastomer having bromine and/or iodine cure sites and containing an aliphatic, cycloaliphatic or saturated or unsaturated alkylaromatic organic peroxide;
  ii) adding to the fluoroelastomer mixture from 0.1 to 3 parts by weight of an additive for reducing toxic emissions of alkylhalo compounds from the curable mixture, on curing, based on 100 parts by weight of a fluoroelastomer, comprising at least one compound selected from the group consisting of:
  a) benzothiazole and derivatives thereof of the formula:

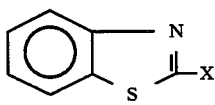

wherein:
X represents H, —SH,

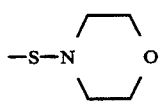

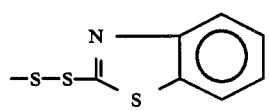

and

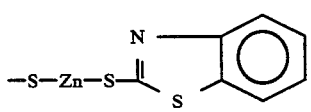

b) maleamide derivatives of the general formula:

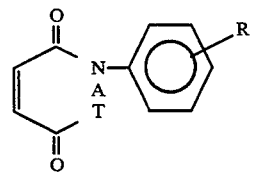

wherein:
A=H, and T represents —OH;
$R$ represents H, alkyl with 1 to 6 carbon atoms, halogen or —NO₂
c) thiuram derivatives of the formula:

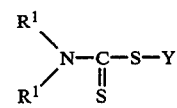

wherein:
Y represents

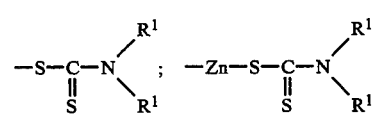

$R^1$ represents alkyl with 1 to 4 carbon atoms,
d) diphenylguanidine derivatives of the formula:

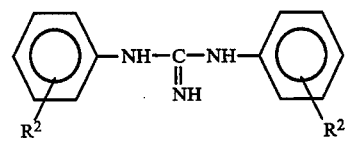

wherein
$R^2$ represents H, alkyl with 1 to 6 carbon atoms; and
e) maleic anhydride, diaryl-formamide and derivatives of diazo and triazodicyclodecenes; and
iii) curing the mixture.
2. The method of claim 1 wherein said additive is present in the mixture in amounts ranging from about 0.2 to 2 parts per 100 parts by weight of elastomer.
3. The method of claim 1 wherein said additive is selected from the group consisting of benzothiazole, 2-mercaptobenzothiazole, benzothiazole disulphide, morpholine-2-benzothiazole sulphenamide and zinc 2-mercapto-benzothiazole.
4. The method of claim 1 wherein said additive is selected from the group consisting of tetraalkylthiuram disulphide and zinc diethyldithiocarbomate.
5. The method of claim 1, wherein said additive is selected from the group consisting of diphenylguanidine derivatives of the formula:

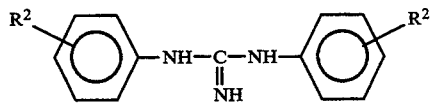

wherein $R^2$ represents H or an alkyl with 1 to 6 carbon atoms.

* * * * *